US012323848B2

(12) United States Patent
Yang et al.

(10) Patent No.: US 12,323,848 B2
(45) Date of Patent: Jun. 3, 2025

(54) METHODS FOR QOS PARAMETER CONFIGURATION AND RELATED APPARATUSES

(71) Applicant: GUANGDONG OPPO MOBILE TELECOMMUNICATIONS CORP., LTD., Guangdong (CN)

(72) Inventors: Haorui Yang, Guangdong (CN); Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 303 days.

(21) Appl. No.: 17/562,970

(22) Filed: Dec. 27, 2021

(65) Prior Publication Data

US 2022/0124549 A1 Apr. 21, 2022

Related U.S. Application Data

(63) Continuation of application No. PCT/CN2020/070709, filed on Jan. 7, 2020.

(51) Int. Cl.
*H04W 28/02* (2009.01)
*H04W 88/04* (2009.01)

(52) U.S. Cl.
CPC ... *H04W 28/0268* (2013.01); *H04W 28/0215* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 2015/0282236 A1* | 10/2015 | Chai | H04W 72/04 370/329 |
| 2018/0234524 A1 | 8/2018 | Cheng et al. | |
| 2018/0352411 A1 | 12/2018 | Ryu et al. | |
| 2019/0281491 A1 | 9/2019 | Cheng et al. | |

(Continued)

FOREIGN PATENT DOCUMENTS

| | | |
|---|---|---|
| CN | 107426776 | 12/2017 |
| CN | 109548008 | 3/2019 |

(Continued)

OTHER PUBLICATIONS

"3rd Generation Partnership Project; Technical Specification Group Services and System Aspects; Policy and charging control framework for the 5G System (5GS); Stage 2 (Release 16)," 3GPP TS 23.503, Dec. 2019, v16.3.0.

(Continued)

*Primary Examiner* — Andre Tacdiran
(74) *Attorney, Agent, or Firm* — Hodgson Russ LLP (57) ABSTRACT

Methods for quality of service (QoS) parameter configuration and related apparatuses are provided. A method for QoS parameter configuration includes the following. A first device obtains a mapping between a first QoS parameter and a second QoS parameter. The first QoS parameter is applied to a first QoS flow, and the second QoS parameter is applied to a second QoS flow. The first QoS flow is a QoS flow between the first device and a network device, and the second QoS flow is a QoS flow between the first device and a second device.

8 Claims, 6 Drawing Sheets

(56) References Cited

U.S. PATENT DOCUMENTS

| | | | | |
|---|---|---|---|---|
| 2019/0335534 | A1* | 10/2019 | Atarius | H04L 65/1016 |
| 2020/0344637 | A1* | 10/2020 | Kim | H04W 4/40 |
| 2020/0374956 | A1* | 11/2020 | Zhu | H04W 48/16 |
| 2021/0219110 | A1* | 7/2021 | Kousaridas | H04W 4/70 |
| 2022/0322135 | A1* | 10/2022 | Xu | H04W 28/0268 |
| 2022/0330193 | A1* | 10/2022 | Shan | H04W 8/005 |
| 2023/0037685 | A1* | 2/2023 | Han | H04L 41/0893 |
| 2023/0052421 | A1 | 2/2023 | Zhu et al. | |
| 2023/0239745 | A1* | 7/2023 | Ke | H04W 36/144 370/331 |

FOREIGN PATENT DOCUMENTS

| | | |
|---|---|---|
| CN | 110035564 | 7/2019 |
| CN | 110225547 A | 9/2019 |
| CN | 110463268 | 11/2019 |
| CN | 110536263 | 12/2019 |
| CN | 114766095 | 7/2022 |
| EP | 3461209 | 3/2019 |
| JP | 2018520588 | 7/2018 |
| WO | 2019143703 | 7/2019 |
| WO | 2019157855 | 8/2019 |
| WO | 2020006366 | 1/2020 |
| WO | 2021082715 A1 | 5/2021 |
| WO | 2021138165 A1 | 7/2021 |

OTHER PUBLICATIONS

CNIPA, Second Office Action for CN Application No. 202210026725.2, Apr. 11, 2023.

Mediatek Inc., "Solution for key issue#3: Support for UE-to-Network Relay," SA WG2 Meeting #136, S2-1911537, Nov. 2019.

CNIPA, Notification to Grant Patent Right for Invention for CN Application No. 202210026725.2, Jun. 25, 2023.

EPO, Communication for EP Application No. 20912307.4, Jun. 30, 2023.

LG Electronics, "TS 23.287 NR PC5 QoS," SA WG2 Meeting #133, S2-1905480 (revision of S2-19xxxxx), May 2019.

CATT, "Procedure on QoS Support over PC5 interface," SA WG2 Meeting #128bis, S2-188159 (revision of S2-18xxxx), Aug. 2018.

WIPO, International Search Report for PCT/CN2020/070709, Sep. 18, 2020.

"3rd Generation Partnership Project; Technical Specification Group Services and System Aspects; Study on system enhancement for Proximity based Services (ProSe) in the 5G System (5GS) (Release 17)," 3GPP TR 23.752, Dec. 2019, v0.2.0.

"3rd Generation Partnership Project; Technical Specification Group Services and System Aspects; Procedures for the 5G System (5GS); Stage 2 (Release 16)," 3GPP TS 23.502, Dec. 2019, v16.3.0.

JPO, Office Action for JP Application No. 2021-577488, Sep. 26, 2023.

IPI, Office Action for IN Application No. 202127060862, Aug. 12, 2022.

EPO, Extended European Search Report for EP 20912307.4, May 9, 2022.

Nokia Networks, "Providing QoS in UE-to-NW Relay Scenario", SA WG2 Meeting #110AH, Aug. 31, 2015, S2-152864, France.

Interdigital Inc., "Solution for KI #3: Support of UE-to-Network Relay", SA WG2 Meeting #136, Nov. 18, 2019, USA.

Ericsson, "RAN Aspects on QoS Parameters," 3GPP TSG-RAN WG2 #97bis, Tdoc R2-1702755, Apr. 2017.

Qualcomm Incorporated et al., "PC5 QoS parameters and standardized PQI definitions for eV2X," SA WG2 Meeting #132, S2-1904448 (was S2-190440 was S2-1904429 was S2-1903394), Apr. 2019.

EPO, Communication for EP Application No. 20912307.4, Jan. 12, 2023.

CNIPA, First Office Action for CN Application No. 202210026725.2, Feb. 23, 2023.

IPOS, Search Report and Written Opinion for SG Application No. 11202114270P, Feb. 9, 2024.

KIPO, Office Action for KR Application No. 10-2022-7003556, Mar. 19, 2025.

* cited by examiner

METHODS FOR QOS PARAMETER CONFIGURATION AND RELATED APPARATUSES

CROSS REFERENCE TO RELATED APPLICATION(S)

This application is a continuation of International Application No. PCT/CN2020/070709, filed on Jan. 7, 2020, the entire disclosure of which is incorporated herein by reference.

TECHNICAL FIELD

This disclosure relates to the field of communication technology, and more particularly to methods for quality of service (QoS) parameter configuration and related apparatuses.

BACKGROUND

Figure 1A:
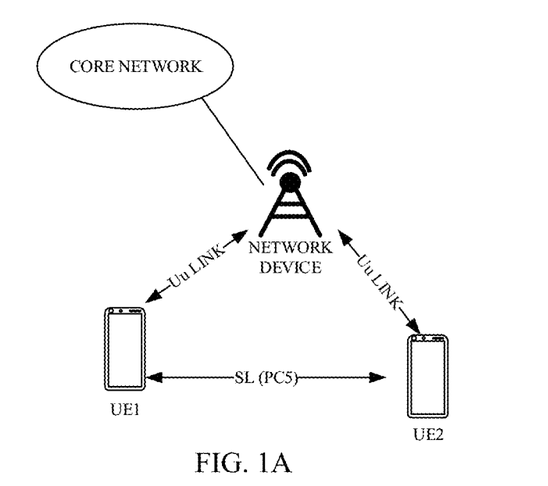
FIG. 1A is a schematic diagram illustrating a position of a PC5 interface provided in implementations of the disclosure.

In future development of mobile communication systems, in order to better satisfy user demand and to improve efficiency of information exchange between devices, a PC5 interface is introduced between devices. Currently, PC5 interface is available for device to device discovery (D2D discovery), D2D communication, and vehicle to everything (V2X). In order to improve network transmission efficiency and to reduce power consumption of a user equipment (UE), a PC5 interface is introduced between UEs. FIG. 1A is a schematic diagram illustrating a position of a PC5 interface. As illustrated in FIG. 1A, the PC5 interface is applicable to D2D communication and V2X communication.

Figure 1B:
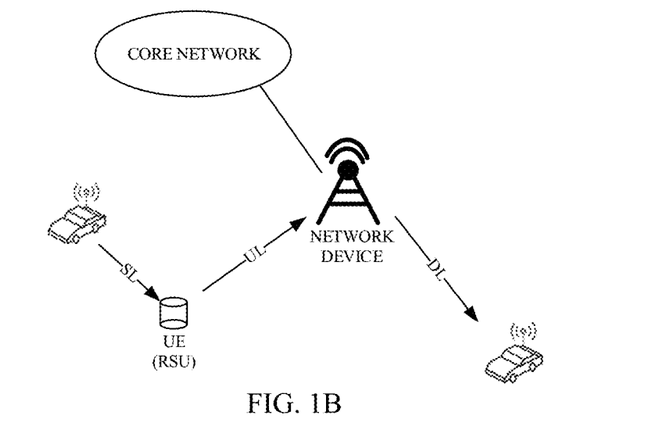
FIG. 1B is a schematic diagram of a relay in vehicle to everything (V2X) provided in implementations of the disclosure.

On the other hand, in order to expand network coverage, etc., a relay is introduced between a UE and a network (NW). FIG. 1B is a schematic diagram of a relay in V2X. As illustrated in FIG. 1B, a road side unit (RSU) acts as a relay to transfer uplink (UL) data between a vehicle and a network. The relay communicates with the vehicle via the PC5 interface, and communicates with the network via a Uu interface. UE1 and UE2 are connected over a sidelink (SL) shared channel. With the diversity of services, various services can be carried concurrently over the PC5 interface by setting up multiple bearers, and for example, in D2D communication, there may be different types of services including voice, video, etc.

SUMMARY

In a first aspect, a method for QoS parameter configuration is provided. The method includes the following. A first device obtains a mapping between a first QoS parameter and a second QoS parameter. The first QoS parameter is applied to a first QoS flow, and the second QoS parameter is applied to a second QoS flow. The first QoS flow is a QoS flow between the first device and a network device, and the second QoS flow is a QoS flow between the first device and a second device.

In a second aspect, a method for QoS parameter configuration is provided. The method includes the following. A network device transmits a mapping between a first QoS parameter and a second QoS parameter. The first QoS parameter is applied to a first QoS flow, and the second QoS parameter is applied to a second QoS flow. The first QoS flow is a QoS flow between a first device and the network device, and the second QoS flow is a QoS flow between the first device and a second device.

In a third aspect, a first device is provided. The first device includes a processor, a memory configured to store one or more programs, and a transceiver. The one or more programs are configured to be executed by the processor and include instructions configured to perform the method described in the first aspect.

In a fourth aspect, a network device is provided. The network device includes a processor, a memory configured to store one or more programs, and a transceiver. The one or more programs are configured to be executed by the processor and include instructions configured to perform the method described in the second aspect.

BRIEF DESCRIPTION OF THE DRAWINGS

The following will give a brief introduction to accompanying drawings used for describing implementations or the related art.

DETAILED DESCRIPTION

The following will describe technical solutions of implementations with reference to the accompanying drawings.

Figure 1C:
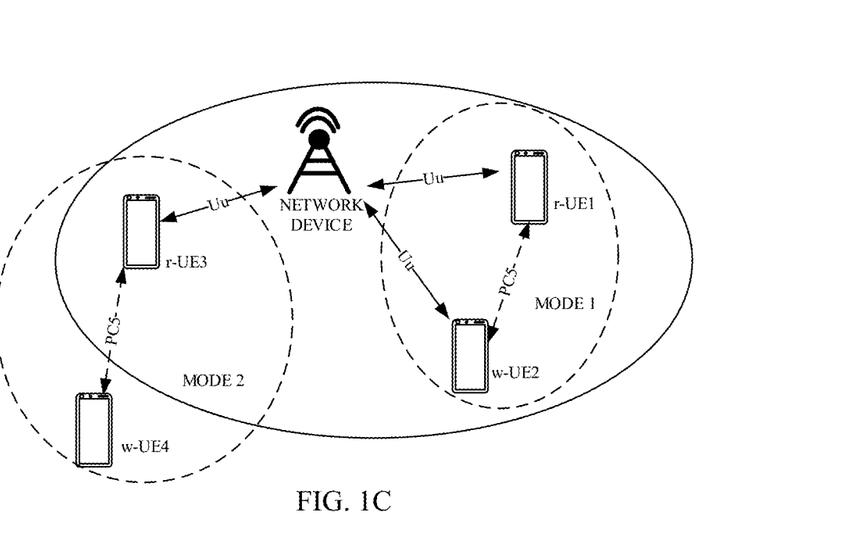
FIG. 1C is a schematic diagram illustrating access of a second device to a network device via a first device provided in implementations of the disclosure.

As illustrated in FIG. 1C, a second device (referred to as w-user equipment (UE) or remote UE) is connected to a first device (referred to as relay UE or r-UE) through device to device (D2D) communication, and the first device accesses a network device. In other words, the w-UE can be connected to the r-UE which acts as a relay node and communicate with the r-UE through D2D communication. The r-UE forwards a data packet from the w-UE to a network, or forwards from the network to the w-UE. The second device may be, for example, a wearable device/enhanced machine type communication (eMTC) device/narrowband-internet of things (NB-IoT) device. The first device may be, for example, a terminal device such as mobile phone.

Technical solutions of implementations may be applied to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (LTE-TDD) system, a universal mobile telecommunication system (UMTS), a worldwide interoperability for microwave access (WiMAX) communication system, a $5^{th}$ generation (5G) system, or a new radio (NR) system.

The terminal of implementations may refer to a UE, an access terminal, a subscriber unit, a subscriber station, a mobile station, a remote station, a remote terminal, a mobile device, a user terminal, a terminal, a wireless communication device, a user agent, or a user device. The terminal may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, a relay device, an in-vehicle device, a wearable device, a terminal in a 5G network, a terminal in a future evolved public land mobile network (PLMN), or the like, and the disclosure is not limited in this regard.

The network device of implementations may be a device that communicates with the terminal. The network device may be a network element of a core network (CN). The network device may be a base transceiver station (BTS) in the GSM or in the CDMA system, or may be a NodeB (NB) in the WCDMA system, or may be an evolved Node B (eNB or eNodeB) in the LTE system, or may be a radio controller in a cloud radio access network (CRAN). Alternatively, the network device may be a relay device, an access point, an in-vehicle device, a wearable device, a network device in the 5G network, or a network device in a future evolved PLMN, an antenna panel or a group of antenna panels (including multiple antenna panels) of a base station in the 5G system, or may be a network node forming a gNB or a transmission point, such as a baseband unit (BBU) or a distributed unit (DU), which is not limited herein.

In some deployments, the gNB may include a centralized unit (CU) and a DU. The gNB may further include an active antenna unit (AAU). The CU implements some functions of the gNB, and the DU implements some other functions of the gNB. For example, the CU is responsible for processing non-real-time protocols and services, and implements functions of a radio resource control (RRC) layer and functions of a packet data convergence protocol (PDCP) layer. The DU is responsible for processing physical (PHY) layer protocols and real-time services, and implements functions of a radio link control (RLC) layer, functions of a media access control (MAC) layer, and functions of a PHY layer. AAU implements some PHY layer processing functions, radio frequency processing functions, and active-antenna related functions. Since RRC layer information will eventually become PHY layer information, or is transformed from PHY layer information, in this architecture, it may be considered that higher layer signaling, such as RRC layer signaling, is transmitted by the DU, or transmitted by the DU and the AAU. It can be understood that, the network device may be a device including one or more of a CU node, a DU node, and an AAU node. In addition, the CU may be categorized as a network device in a radio access network (RAN), or may be categorized as a network device in a core network (CN), which is not limited herein.

In implementations of the disclosure, the terminal or the network device includes a hardware layer, an operating system layer running above the hardware layer, and an application layer running above the operating system layer. The hardware layer includes hardware such as a central processing unit (CPU), a memory management unit (MMU), and a memory (also referred to as main memory). The operating system may be any one or more computer operating systems that achieve service processing through a process, for example, a Linux operating system, a Unix operating system, an Android operating system, an iOS operating system, or a Windows operating system. The application layer includes applications such as a browser, a contact list, word processing software, and instant messaging (IM) software. In addition, implementations of the disclosure do not constitute limitation on the structure of an execution entity of a method provided in implementations, as long as the execution entity can communicate according to the method provided herein by running programs that record codes of the method. For example, the execution entity of the method may be the terminal, or may be a functional module in the terminal that can invoke and execute programs.

At present, with continuous development of 5G applications, a network controlled interactive services (NCIS) service is introduced to the standard as a new service form for related standardization. The NCIS service is mainly intended for augmented reality (AR)/virtual reality (VR), games and other applications, and has high requirements on service quality such as rate, delay, packet loss rate, and high-speed encoding and decoding. For example, for a VR game, a rate up to 10 Gbps (gigabits per second) is required, and the packet loss rate cannot exceed 10E-4. A session established for the NCIS service is an NCIS session, and UEs in the same NCIS session can be considered to form one NCIS group, for example, a team in a game. The UEs in the NCIS group may have the following communication modes, which can be used in combination:

In-proximity with each other: For example, broadcast or multicast through D2D technology, or establish a sidelink (also known as using a PC5 interface) for one-to-one communication (unicast);

Non-proximity with each other: For example, using UE-network-server-peer network-peer UE (also known as using a Uu interface).

The UEs in a group may come from the same PLMN, or may come from different PLMNs. For example, there are five UEs in an NCIS group, among which three UEs belong to PLMN 1, and two UEs belong to PLMN 2. The three UEs in PLMN 1 can directly communicate with each other over the PC5 interface through D2D technology, and can also communicate with the two UEs in PLMN 2 using a network.

Figure 1D:
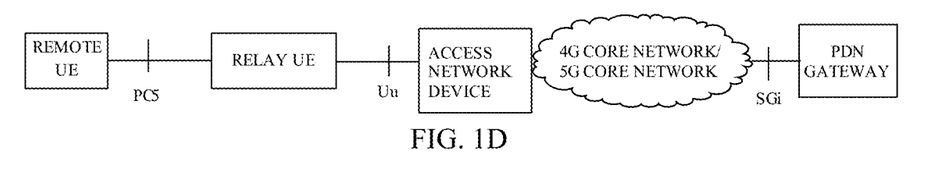
FIG. 1D is a schematic architectural diagram of a system using a relay service provided in implementations of the disclosure.

FIG. 1D illustrates a system architecture of a UE-to-network relay. The UE-to-network relay serves the remote UE for communication. SGi is an interface between a core network and a packet data network (PDN) gateway. Such an architecture can provide services which have higher speed and higher reliability.

Figure 1E:
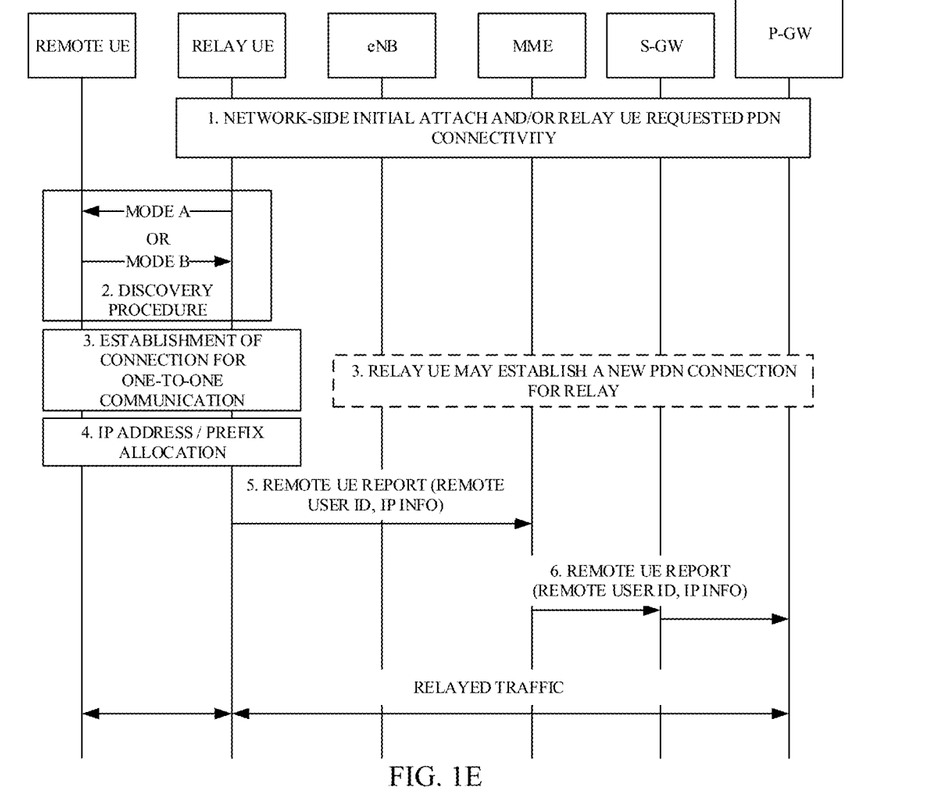
FIG. 1E is a flowchart illustrating signaling interaction in relayed traffic initialization provided in implementations of the disclosure.

FIG. 1E is a flowchart illustrating signaling interaction in relayed traffic initialization provided in implementations of the disclosure, which includes the following operations.

Step 1, evolved universal mobile telecommunications system (UMTS) terrestrial radio access network (E-UTRAN) (that is, network side) initial attach and/or relay UE requested PDN connectivity.

Step 2, a relay UE and a remote UE complete a discovery procedure.

Step 3, the relay UE and the remote UE complete establishment of connection for one-to-one communication.

Alternative step 3, the relay UE may establish a new PDN connection for relay.

Step 4, the remote UE reports to the relay UE internet protocol (IP) address/prefix allocation.

Step 5, the remote UE reports to the network side a remote UE report (remote user identity (ID), IP info).

Step 6, a network side entity (i.e. mobile management entity (MME)) forwards the remote UE report (remote user ID, IP info).

In the above process, in alternative step 3, in order to transmit relayed data of the remote UE, the relay UE needs to use a proper PDN connection. Which PDN connection is used to transmit the relayed data is determined by the relay UE. In general, the relay UE can transmit all relayed data by using one dedicated PDN connection. In a 5G architecture, the relay UE may establish a proper packet data unit (PDU) session to transmit data of the remote UE. Uplink (UL) data: remote UE-》 relay UE-》 RAN-》 5G core (5GC)-》 data network name (DNN)-》 application server. Downlink (DL) data flows in an opposite direction.

In order to provide better service for the remote UE, and meet requirements of different services such as transmission rate, delay, packet loss rate, and the like, a PC5 link and a PDU session of the relay UE each have a quality of service (QoS) flow used for data transmission. Different QoS flows support different QoS requirements. How the relay UE can match a QoS flow in a PC5 link and a QoS flow in a PDU session is a problem to be solved.

In order to solve the above problem, implementations provide a method for QoS parameter configuration, which will be described in detail below with reference to the accompanying drawings.

Figure 2A:
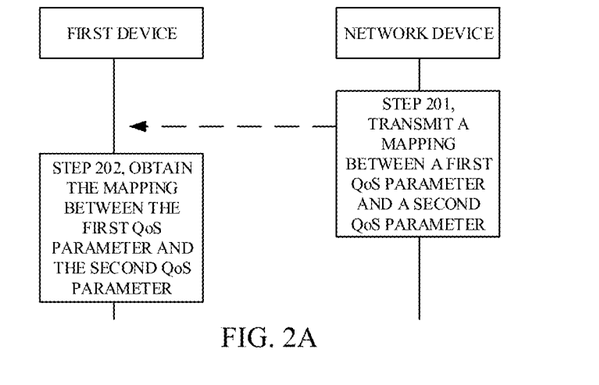
FIG. 2A is a schematic flowchart of a method for quality of service (QoS) parameter configuration provided in implementations of the disclosure.

FIG. 2A is a schematic flowchart of a method for QoS parameter configuration provided in implementations of the disclosure. As illustrated in FIG. 2A, the method includes the following.

At step 2a01, a network device transmits a mapping between a first QoS parameter and a second QoS parameter. The first QoS parameter is applied to a first QoS flow, and the second QoS parameter is applied to a second QoS flow. The first QoS flow is a QoS flow between a first device (i.e. relay UE) and the network device, and the second QoS flow is a QoS flow between the first device and a second device (i.e. remote UE).

The mapping between the first QoS parameter and the second QoS parameter may be described as PC5 QoS-Uu QoS mapping in protocols.

The network device may transmit the mapping to all UEs that support 5G proximity service (ProSe). Alternatively, the network device may transmit the mapping only to a UE(s) that can act as a relay UE. Alternatively, the network device may transmit the mapping to a specified relay UE according to an identifier of a relay UE and/or an identifier of a remote UE received by the network device. The disclosure is not limited in this regard.

At step 2a02, the first device obtains the mapping between the first QoS parameter and the second QoS parameter. The first QoS parameter is applied to the first QoS flow, and the second QoS parameter is applied to the second QoS flow. The first QoS flow is a QoS flow between the first device and the network device, and the second QoS flow is a QoS flow between the first device and the second device.

In this implementation, the first device is a relay device which is used for the second device to access the network device. The first device obtains the mapping between the first QoS parameter and the second QoS parameter. The first QoS parameter is applied to the first QoS flow, and the second QoS parameter is applied to the second QoS flow. The first QoS flow is a QoS flow between the first device and the network device, and the second QoS flow is a QoS flow between the first device and the second device. Therefore, according to the mapping, the first device can use a correct QoS flow to relay data which is transmitted to the network device by the second device or to relay data which is transmitted to the second device by the network device, to provide better service for the second device.

In some implementations, the first QoS parameter includes a 5G QoS index (5QI), and the second QoS parameter includes a PC5 QoS index (PQI).

As an example, the PC5 QoS-Uu QoS mapping may be a mapping between the 5QI and the PQI, for example, 5QI 1 corresponds to PQI 21.

A possible format of the PC5 QoS-Uu QoS mapping is shown in table 1. A PC5 Uu QoS mapping information element identifier (IEI) may include a length of PC5 Uu QoS mapping indicator field, a spare bit, a QoS flow index (QFI) indicator field, and a mapped PQI indicator field, where the QFI corresponds to the 5QI, that is, the QFI corresponds to a QoS flow between the first device and the network device (that is, the first QoS flow, which is also referred to as Uu QoS flow).

TABLE 1

| PC5 Uu QoS mapping IEI | | |
|---|---|---|
| Length of PC5 Uu QoS mapping | | |
| 0 Spare | 0 Spare | QFI |
| 0 Spare | 0 Spare | Mapped PQI |
| ... | ... | ... |
| 0 Spare | 0 Spare | QFI |
| 0 Spare | 0 Spare | Mapped PQI |

In this implementation, the mapping between the first QoS parameter and the second QoS parameter can be accurately indicated through the mapping between the 5QI and the PQI, which is small in data amount and high in transmission efficiency.

In other implementations, the first QoS parameter includes an identifier of the first QoS flow, and the second QoS parameter includes an identifier of the second QoS flow, where the identifier is an ID or an index.

As an example, the ID of the second QoS flow (also referred to as PC5 QoS flow) is 21, and the ID of the first QoS flow (also referred to as Uu QoS flow) is 1. In this case, the mapping between the first QoS parameter and the second QoS parameter is that PC5 QoS flow 21 corresponds to Uu QoS flow 1.

Another possible format of the PC5 QoS-Uu QoS mapping is shown in table 2. A PC5 Uu QoS mapping IEI may include a length of PC5 Uu QoS mapping indicator field, a spare bit, a first QoS flow ID indicator field, and a second QoS flow ID indicator field.

TABLE 2

| PC5 Uu QoS mapping IEI | | |
|---|---|---|
| Length of PC5 Uu QoS mapping | | |
| 0 Spare | 0 Spare | Uu QoS flow ID |
| 0 Spare | 0 Spare | Mapped PC5 QoS flow ID |
| ... | | |
| 0 Spare | 0 Spare | Uu QoS flow ID |
| 0 Spare | 0 Spare | Mapped PC5 QoS flow ID |

In this example, the mapping between the first QoS parameter and the second QoS parameter can be accurately indicated through an identifier of a QoS flow, which is small in data amount and high in transmission efficiency.

In some implementations, the first device obtains the mapping between the first QoS parameter and the second QoS parameter as follows. The first device receives the mapping between the first QoS parameter and the second QoS parameter from the network device.

Accordingly, the network device transmits the mapping between the first QoS parameter and the second QoS parameter as follows. The network device transmits the mapping between the first QoS parameter and the second QoS parameter to the first device.

The network device can obtain an identifier of the first device that is required for a relay service, and transmit the mapping between the first QoS parameter and the second QoS parameter to the first device according to the identifier of the first device.

In this implementation, the network device can configure the mapping between the first QoS parameter and the second QoS parameter exclusively for the first device, and as such, only the first device can receive the mapping, which can avoid interference of other devices and thus is high in accuracy.

In some implementations, the mapping between the first QoS parameter and the second QoS parameter is configured through UE policy signaling.

In some implementations, the first device receives the mapping between the first QoS parameter and the second QoS parameter from the network device as follows. The first device receives the UE policy signaling from the network device (for example, policy control function (PCF)), where the UE policy signaling contains the mapping between the first QoS parameter and the second QoS parameter.

Accordingly, the network device transmits the mapping between the first QoS parameter and the second QoS parameter to the first device as follows. The network device transmits the UE policy signaling to the first device, where the UE policy signaling contains the mapping between the first QoS parameter and the second QoS parameter.

In this implementation, the mapping between the first QoS parameter and the second QoS parameter is configured through the UE policy signaling. As such, there is no need to initiate new signaling, which in high in adaptability.

In some implementations, the mapping between the first QoS parameter and the second QoS parameter is configured through PDU session signaling.

In some implementations, before the first device receives the mapping between the first QoS parameter and the second QoS parameter from the network device, the following can be performed. If no PDU session for a service of the second device is detected by the first device, the first device transmits a PDU session establishment request to the network device. The first device receives the mapping between the first QoS parameter and the second QoS parameter from the network device (for example, session management function (SMF)) as follows. The first device receives a PDU session establishment response transmitted by the network device, where the PDU session establishment response contains the mapping between the first QoS parameter and the second QoS parameter.

Accordingly, before the network device transmits the mapping between the first QoS parameter and the second QoS parameter to the first device, the following can be performed. The network device receives a PDU session establishment request from the first device, where the PDU session establishment request is transmitted by the first device when no PDU session for a service of the second device is detected by the first device. The network device transmits the mapping between the first QoS parameter and the second QoS parameter to the first device as follows. The network device transmits a PDU session establishment response to the first device, where the PDU session establishment response contains the mapping between the first QoS parameter and the second QoS parameter.

In some implementations, the PDU session establishment request contains a relay indication. The relay indication is used for indicating to the network device that the PDU session can be used for transmitting relayed data.

The PDU session establishment request may further contain a DNN and a single-network slice selection assistance information (S-NSSAI).

In this implementation, a PDU session that has been established between the network device and the first device may include one or more Uu QoS flows. The PC5 QoS-Uu QoS mapping may include QoS flow descriptions that are in one-to-one correspondence with Uu QoS flows, which may be represented by QoS flow description information element shown in table 3. QoS flow description IEI represents QoS flow description information element identifier, length of QoS flow description contents represent a length of QoS flow description contents, QoS flow description 1 represents a QoS flow description of Uu QoS flow 1, QoS flow description 2 represents a QoS flow description of Uu QoS flow 2, octet represents a byte number of an octet field, and so forth.

TABLE 3

| QoS flow description IEI | octet 1 |
|---|---|
| | octet 2 |
| Length of QoS flow description contents | octet 3 |
| | octet 4 |
| QoS flow description 1 | octet u |
| | octet u + 1 |
| QoS flow description 2 | octet v |
| | octet v + 1 |
| ... | octet w |
| | octet w + 1 |
| QoS flow description n | octet x |

Taking a field of which the byte number is octet 4~octet U as an example, a possible format of the field may be the QoS flow description shown in table 4.

TABLE 4

| | | | | QoS flow description | | | | |
|---|---|---|---|---|---|---|---|---|
| 8 | 7 | 6 | 5 | 4 | 3 | 2 | 1 | |
| 0 Spare | 0 Spare | | | QFI | | | | octet 4 |
| Operation code | | 0 Spare | 0 Spare | 0 Spare | 0 Spare | 0 Spare | | octet 5 |
| 0 Spare | E | | | Number of parameters | | | | octet 6 |
| | | | | Parameter list | | | | octet 7* octet u* |

Horizontal numbers represent bit numbers, vertical numbers represent byte numbers, operation code represents an operation code, number of parameters represents a parameter ID, and parameter list represents a list of parameters. A possible format of the parameters list field is the parameter list shown in table 5.

TABLE 5

| | | | | Parameter list | | | | |
|---|---|---|---|---|---|---|---|---|
| 8 | 7 | 6 | 5 | 4 | 3 | 2 | 1 | |
| | | | | Parameter 1 | | | | octet 7 octet m |
| | | | | Parameter 2 | | | | octet m + 1 octet n |
| | | | | ... | | | | octet n + 1 octet o |
| | | | | Parameter n | | | | octet o + 1 octet u |

Horizontal numbers represent bit numbers, vertical numbers represent byte numbers, Parameter 1 represents parameter configuration information of Uu QoS flow 1, and Parameter 2 represents parameter configuration information of Uu QoS flow 2. A format of each parameter field is the parameter shown in table 6.

TABLE 6

| | | | | Parameter | | | | |
|---|---|---|---|---|---|---|---|---|
| 8 | 7 | 6 | 5 | 4 | 3 | 2 | 1 | |
| | | | | Parameter identifier | | | | octet 7 |
| | | | | Length of parameter contents | | | | octet 8 |
| | | | | Parameter contents | | | | octet 9 octet m |

Horizontal numbers represent bit numbers, vertical number represent byte numbers (taking octet 7~octet m as an example), parameter identifier indicates an identifier of a parameter, length of parameter contents represents a length of parameter contents, and parameter contents represent the text of a parameter.

A first indicator field of each parameter may be indicative of indication information of a 5QI, and a second indicator field of each parameter may be indicative of indication information of a mapped PQI of the 5QI indicated by the first indicator field. The first indicator field is a $1^{st}$ bit. The second indicator field may be an $8^{th}$ bit, or may be a bit that is subsequent to the $8^{th}$ bit and has no conflict with an existing protocol. The disclosure is not limited in this regard.

In this implementation, the mapping between the first QoS parameter and the second QoS parameter is configured through the PDU session signaling. As such, there is no need to initiate new signaling, which in high in adaptability.

In other implementations, before the first device receives the mapping between the first QoS parameter and the second QoS parameter from the network device, the following can be performed. When the first device detects that a new QoS flow is generated due to a connection between the first device and the second device, the first device transmits a PDU session modification request to the network device. The first device receives the mapping between the first QoS parameter and the second QoS parameter from the network device (for example, SMF) as follows. The first device receives a PDU session modification response transmitted by the network device, where the PDU session modification response contains the mapping between the first QoS parameter and the second QoS parameter.

Accordingly, before the network device transmits the mapping between the first QoS parameter and the second QoS parameter to the first device, the following can be performed. The network device receives the PDU session modification request from the first device, where the PDU session modification request is transmitted by the first device when the first device detects that a new QoS flow is generated due to a connection between the first device and the second device. The network device transmits the mapping between the first QoS parameter and the second QoS parameter to the first device as follows. The network device transmits the PDU session modification response to the first device, where the PDU session modification response contains the mapping between the first QoS parameter and the second QoS parameter.

In some implementations, the PDU session modification request contains a relay indication.

The PDU session modification request may further contain a PC5 QoS parameter (such as PQI, guaranteed bit rate (GBR), maximum bit rate (MBR), etc.), which is not limited herein.

The relay indication is used for the network device to determine a target relay UE, for which the mapping is configured, as the first device.

In this implementation, the mapping between the first QoS parameter and the second QoS parameter is configured through the PDU session signaling. As such, there is no need to initiate new signaling, which in high in adaptability.

In some implementations, before the first device obtains the mapping between the first QoS parameter and the second QoS parameter, the following can be performed. The first device transmits first capability indication information to the network device, where the first capability indication information is used for indicating that the first device supports a relay service.

Accordingly, before the network device transmits the mapping between the first QoS parameter and the second QoS parameter, the following can be performed. The network device receives the first capability indication information from the first device, where the first capability indication information is used for indicating that the first device supports a relay service.

The first capability indication information may be, for example, one bit in 5G mobility management (MM) capability indication information, where 1 indicates "support", and 0 indicates "not support".

In this implementation, the first device reports its capability information to a network side. As such, the network device can promptly transmit configuration information directionally, which is possible to improve efficiency in QoS parameter configuration.

In some implementations, the first device transmits the first capability indication information to the network device as follows. The first device transmits the first capability indication information to the network device (for example, access and mobility management function (AMF)) during network registration.

Accordingly, the first capability indication information is transmitted by the first device during network registration.

During network registration, the relay UE may report to the network device that the relay UE can act as a relay UE.

In other implementations, the first device transmits the first capability indication information to the network device as follows. The first device transmits the first capability indication information to the network device (for example, SMF or PCF) after network registration.

Accordingly, the first capability indication information is transmitted by the first device after network registration.

After network registration, the relay UE may notify the network device that the relay UE can act as a relay UE.

In some implementations, the first device transmits the first capability indication information to the network device as follows. The first device transmits the first capability indication information to the network device (for example, SMF or PCF) after the first device establishes a first connection with the second device.

Accordingly, the first capability indication information is transmitted by the first device after the first device establishes the first connection with the second device.

The first device may broadcast or multicast by using D2D technology, or establish a sidelink (also referred to as using a PC5 interface) for one-to-one communication (unicast). The first connection is a PC5 link.

After a PC5 link is established between the first device and the second device, the relay UE notifies the network device. The relay UE may notify an AMF, and then the AMF notifies a PCF.

In some implementations, the method further includes the following. The first device establishes an association between the first QoS flow and the second QoS flow according to the mapping between the first QoS parameter and the second QoS parameter.

For example, an ID of a PC5 QoS flow using PQI 21 is 21, an ID of a Uu QoS flow using 5QI 1 is 1, and PC5 QoS flow 21 corresponds to Uu QoS flow 1. When DL data reaches the relay UE through Uu QoS flow 1, the relay UE first determines a PC5 link of a remote UE corresponding to the DL data, and then uses PC5 QoS flow 21 in the PC5 link to transmit data to the remote UE. For UL data transmission, a process similar to the above process is adopted.

Such association establishment may take place after the relay UE receives the mapping.

In this implementation, the first device establishes the association between the first QoS flow and the second QoS flow according to the mapping obtained. As such, the first device can use the first QoS flow and the second QoS flow for information relay service between the second device and the network device.

In some implementations, before the first device establishes the association between the first QoS flow and the second QoS flow according to the mapping between the first QoS parameter and the second QoS parameter, the method further includes the following. The first device obtains first data to-be-transmitted.

The association establishment may take place when the relay UE detects the arrival of data.

In this implementation, the first device triggers establishment of the association once data to-be-transmitted is detected, and can release the association after transmission is completed, that is, association establishment takes place only when there is a need for use, which is possible to improve maintenance efficiency.

The following will elaborate the method for QoS parameter configuration with specific examples.

Figure 2B:
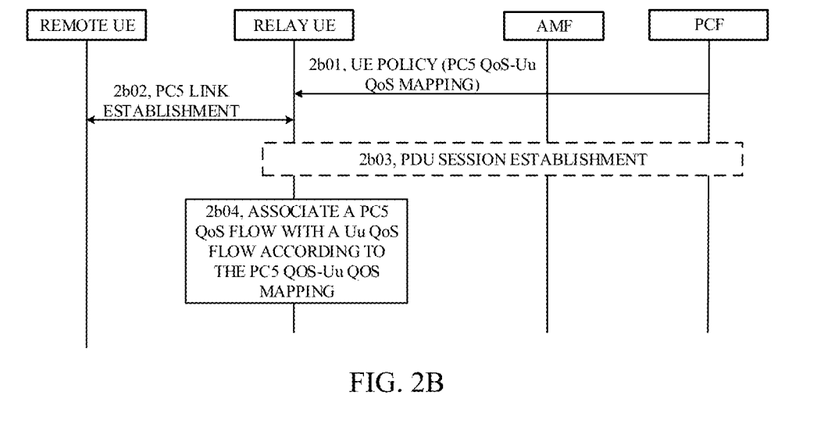
FIG. 2B is a schematic flowchart of a method for QoS parameter configuration provided in other implementations of the disclosure.

As illustrated in FIG. 2B, the mapping between the first QoS parameter and the second QoS parameter is configured through the UE policy signaling. The network device includes an AMF and a PCF. A method for QoS parameter configuration includes the following.

Step 2*b*01, the PCF transmits UE policy to a relay UE, where the UE policy contains a PC5 QoS-Uu QoS mapping.

Step 2*b*02, PC5 link establishment between the relay UE and a remote UE.

Step 2*b*03, if there is no PDU session for a service of the remote UE, the relay UE establishes a PDU session corresponding to a service of the remote UE.

Step 2*b*04, the relay UE associates a PC5 QoS flow with a Uu QoS flow according to the PC5 QoS-Uu QoS mapping.

Figure 2C:
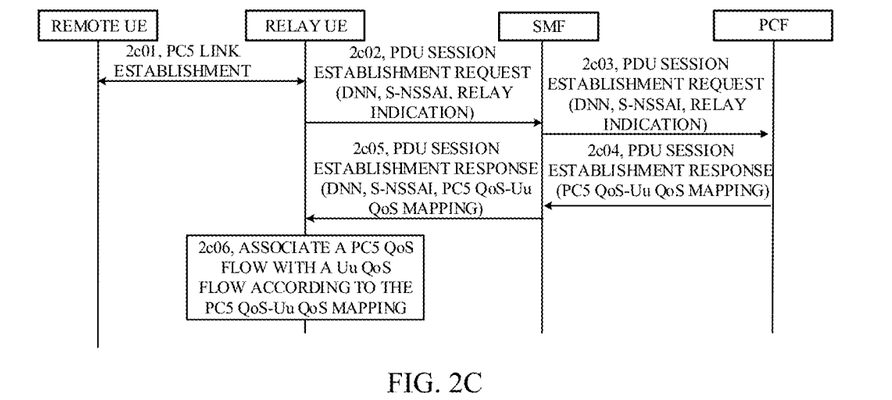
FIG. 2C is a schematic flowchart of a method for QoS parameter configuration provided in other implementations of the disclosure.

As illustrated in FIG. 2C, the mapping between the first QoS parameter and the second QoS parameter is configured through PDU session signaling. The network device includes an SMF and a PCF. A method for QoS parameter configuration includes the following.

Step 2*c*01, PC5 link establishment between a relay UE and a remote UE.

Step 2*c*02, if there is no PDU session for a service of the remote UE, the relay UE establishes a PDU session corresponding to a service of the remote UE. The relay UE transmits a PDU session establishment request to the SMF, where the PDU session establishment request contains a DNN, an S-NSSAI, and a relay indication.

Step 2*c*03, the SMF transmits parameters, which are transmitted by the relay UE in step 2*c*02, to the PCF.

Step 2*c*04, the PCF receives the relay indication from the SMF. The PCF can transmit a PDU session establishment response to the SMF, where the PDU session establishment response contains a PC5 QoS-Uu QoS mapping, the DNN, and the S-NSSAI.

Step 2*c*05, the SMF transmits the PC5 QoS-Uu QoS mapping to the relay UE.

Step 2*c*06, the relay UE associates a PC5 QoS flow with a Uu QoS flow according to the PC5 QoS-Uu QoS mapping.

Figure 3:
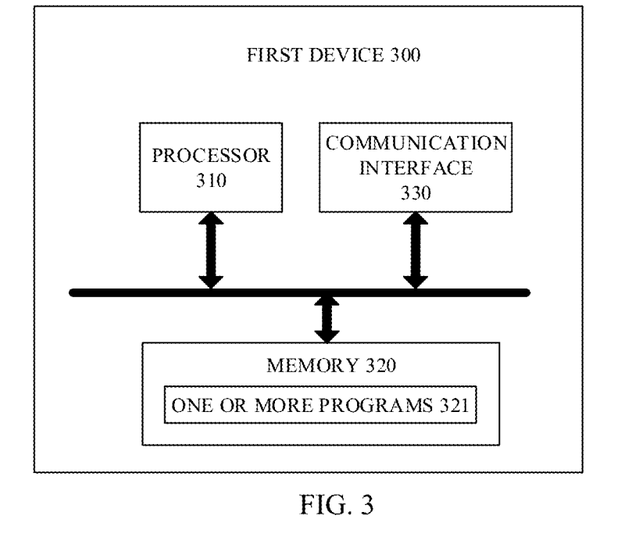
FIG. 3 is a schematic structural diagram of a first device provided in implementations of the disclosure.

Similar to the implementations illustrated in FIG. 2A, FIG. 3 is a schematic structural diagram of a first device 300 provided in implementations of the disclosure. As illustrated in FIG. 3, the first device 300 includes a processor 310, a memory 320 configured to store one or more programs 321, and a communication interface 330. The one or more programs 321 are configured to be executed by the processor 310 and include instructions configured to perform the following operations.

A mapping between a first QoS parameter and a second QoS parameter is obtained. The first QoS parameter is applied to a first QoS flow, and the second QoS parameter is applied to a second QoS flow. The first QoS flow is a QoS flow between the first device and a network device, and the second QoS flow is a QoS flow between the first device and a second device.

In this implementation, the first device is a relay device which is used for the second device to access the network device. The first device obtains the mapping between the first QoS parameter and the second QoS parameter. The first QoS parameter is applied to the first QoS flow, and the second QoS parameter is applied to the second QoS flow. The first QoS flow is a QoS flow between the first device and the network device, and the second QoS flow is a QoS flow between the first device and the second device. Therefore, according to the mapping, the first device can use a correct QoS flow to relay data which is transmitted to the network device by the second device or to relay data which is transmitted to the second device by the network device, thereby providing better service for the second device.

In some implementations, the first QoS parameter includes a 5QI, and the second QoS parameter includes a PQI.

In other implementations, the first QoS parameter includes an identifier of the first QoS flow, and the second QoS parameter includes an identifier of the second QoS flow, where the identifier is an ID or an index.

In some implementations, in terms of obtaining the mapping between the first QoS parameter and the second QoS parameter, the instructions in the one or more programs are configured to receive the mapping between the first QoS parameter and the second QoS parameter from the network device.

In some implementations, the mapping between the first QoS parameter and the second QoS parameter is configured through UE policy signaling.

In some implementations, in terms of receiving the mapping between the first QoS parameter and the second QoS parameter from the network device, the instructions in the one or more programs are configured to receive the UE policy signaling from the network device, where the UE policy signaling contains the mapping between the first QoS parameter and the second QoS parameter.

In other implementations, the mapping between the first QoS parameter and the second QoS parameter is configured through PDU session signaling.

In some implementations, the one or more programs further include instructions configured to transmit a PDU session establishment request to the network device when no PDU session for a service of the second device is detected, before receiving the mapping between the first QoS parameter and the second QoS parameter from the network device. In terms of receiving the mapping between the first QoS parameter and the second QoS parameter from the network device, the instructions in the one or more programs are configured to receive a PDU session establishment response transmitted by the network device, where the PDU session establishment response contains the mapping between the first QoS parameter and the second QoS parameter.

In some implementations, the PDU session establishment request contains a relay indication.

In other implementations, the one or more programs further include instructions configured to transmit a PDU session modification request to the network device when a new QoS flow generated due to a connection between the first device and the second device is detected, before receiving the mapping between the first QoS parameter and the second QoS parameter from the network device. In terms of receiving the mapping between the first QoS parameter and the second QoS parameter from the network device, the instructions in the one or more programs are configured to receive a PDU session modification response transmitted by the network device, where the PDU session modification response contains the mapping between the first QoS parameter and the second QoS parameter.

In some implementations, the PDU session modification request contains a relay indication.

In some implementations, the one or more programs further include instructions configured to transmit first capability indication information to the network device, before obtaining the mapping between the first QoS parameter and the second QoS parameter. The first capability indication information is used for indicating that the first device supports a relay service.

In some implementations, in terms of transmitting the first capability indication information to the network device, the instructions in the one or more programs are configured to transmit the first capability indication information to the network device during network registration.

In other implementations, in terms of transmitting the first capability indication information to the network device, the instructions in the one or more programs are configured to transmit the first capability indication information to the network device after network registration.

In other implementations, in terms of transmitting the first capability indication information to the network device, the instructions in the one or more programs are configured to transmit the first capability indication information to the network device after the first device establishes a first connection with the second device.

In some implementations, the one or more programs further include instructions configured to establish an association between the first QoS flow and the second QoS flow according to the mapping between the first QoS parameter and the second QoS parameter.

In some implementations, the one or more programs further include instructions configured to obtain first data to-be-transmitted, before establishing the association between the first QoS flow and the second QoS flow according to the mapping between the first QoS parameter and the second QoS parameter.

Figure 4:
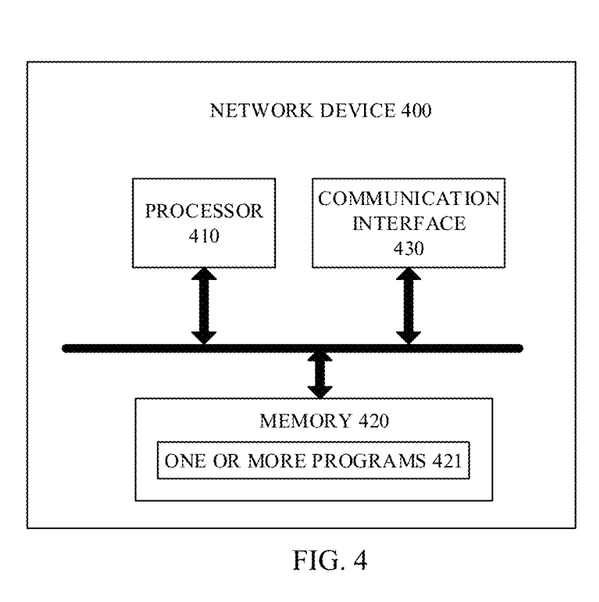
FIG. 4 is a schematic structural diagram of a network device provided in implementations of the disclosure.

FIG. 4 is a schematic structural diagram of a network device 400 provided in implementations of the disclosure. As illustrated in FIG. 4, the network device 400 includes a processor 410, a memory 420 configured to store one or more programs 421, and a communication interface 430. The one or more programs 421 are configured to be executed by the processor 410 and include instructions configured to perform the following operations.

A mapping between a first QoS parameter and a second QoS parameter is transmitted. The first QoS parameter is applied to a first QoS flow, and the second QoS parameter is applied to a second QoS flow. The first QoS flow is a QoS flow between a first device and the network device, and the second QoS flow is a QoS flow between the first device and a second device.

In this implementation, the first device is a relay device which is used for the second device to access the network device. The first device obtains the mapping between the first QoS parameter and the second QoS parameter. The first QoS parameter is applied to the first QoS flow, and the second QoS parameter is applied to the second QoS flow. The first QoS flow is a QoS flow between the first device and the network device, and the second QoS flow is a QoS flow between the first device and the second device. Therefore, according to the mapping, the first device can use a correct QoS flow to relay data which is transmitted to the network device by the second device or to relay data which is transmitted to the second device by the network device, thereby providing better service for the second device.

In some implementations, the first QoS parameter includes a 5QI, and the second QoS parameter includes a PQI.

In other implementations, the first QoS parameter includes an identifier of the first QoS flow, and the second QoS parameter includes an identifier of the second QoS flow, where the identifier is an ID or an index.

In some implementations, in terms of transmitting the mapping between the first QoS parameter and the second QoS parameter, the instructions in the one or more programs are configured to transmit the mapping between the first QoS parameter and the second QoS parameter to the first device.

In some implementations, the mapping between the first QoS parameter and the second QoS parameter is configured through UE policy signaling.

In some implementations, in terms of transmitting the mapping between the first QoS parameter and the second QoS parameter to the first device, the instructions in the one or more programs are configured to transmit the UE policy signaling to the first device, where the UE policy signaling contains the mapping between the first QoS parameter and the second QoS parameter.

In other implementations, the mapping between the first QoS parameter and the second QoS parameter is configured through PDU session signaling.

In some implementations, the one or more programs further include instructions configured to receive a PDU session establishment request from the first device before transmitting the mapping between the first QoS parameter and the second QoS parameter to the first device, where the PDU session establishment request is transmitted by the first device when no PDU session for a service of the second device is detected by the first device. In terms of transmitting the mapping between the first QoS parameter and the second QoS parameter to the first device, the instructions in the one or more programs are configured to transmit a PDU session establishment response to the first device, wherein the PDU session establishment response contains the mapping between the first QoS parameter and the second QoS parameter.

In some implementations, the PDU session establishment request contains a relay indication.

In other implementations, the one or more programs further include instructions configured to receive a PDU session modification request from the first device before transmitting the mapping between the first QoS parameter and the second QoS parameter to the first device, where the PDU session modification request is transmitted by the first device when the first device detects that a new QoS flow is generated due to a connection between the first device and the second device. In terms of transmitting the mapping between the first QoS parameter and the second QoS parameter to the first device, the instructions in the one or more programs are configured to transmit a PDU session modification response to the first device, where the PDU session modification response contains the mapping between the first QoS parameter and the second QoS parameter.

In some implementations, the PDU session modification request contains a relay indication.

In some implementations, the one or more programs further include instructions configured to receive first capability indication information from the first device before transmitting the mapping between the first QoS parameter and the second QoS parameter, where the first capability indication information is used for indicating that the first device supports a relay service.

In some implementations, the first capability indication information is transmitted by the first device during network registration.

In other implementations, the first capability indication information is transmitted by the first device after network registration.

In other implementations, the first capability indication information is transmitted by the first device after the first device establishes a first connection with the second device.

Technical solutions of implementations have been elaborated above from the perspective of interaction between various network elements. It can be understood that, in order to implement the above functions, a terminal includes hardware structures and/or software modules for performing respective functions. Those of ordinary skill in the art will appreciate that units and algorithmic operations of various examples described in connection with implementations herein can be implemented by hardware or by a combination of hardware and computer software. Whether these functions are performed by means of hardware or hardware driven by computer software depends on the application and the design constraints of the associated technical solution. Those skilled in the art may use different methods with regard to each particular application to implement the described functionality, but such methods should not be regarded as lying beyond the scope of the disclosure.

Division of functional units of the terminal may be implemented according to the above method implementations. For example, various functional units may be in one-to-one correspondence with each function, or two or more functions may be integrated into one processing unit. The integrated unit may be implemented in the form of hardware, or may be implemented in the form of software program module. Division of units in implementations herein is illustrative and is only a division of logical functions, and there may exist other manners of division in practice.

Figure 5:
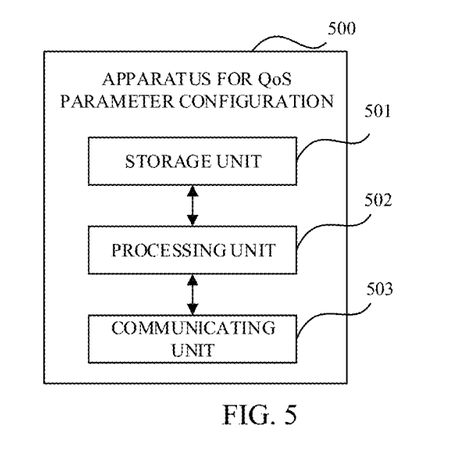
FIG. 5 is a block diagram illustrating functional units of an apparatus for QoS parameter configuration provided in implementations of the disclosure.

If the integrated unit is adopted, FIG. 5 is a block diagram illustrating functional units of an apparatus for QoS parameter configuration provided in implementations of the disclosure. The apparatus 500 for QoS parameter configuration is applicable to a first device. The apparatus 500 includes a processing unit 502 and a communicating unit 503. The processing unit 502 is configured to control and manage operations of the terminal. For example, the processing unit 502 is configured for the terminal to perform operations at step 2a02 illustrated in FIG. 2A and/or other processes described in the technical solutions of implementations. The communicating unit 503 is configured for the terminal to communicate with other devices. The terminal may further include a storage unit 501. The storage unit 501 is configured to store program codes and data of the terminal.

The processing unit 502 may be a processor or a controller and may be, for example, a CPU, a general-purpose processor, a digital signal processor (DSP), an application-specific integrated circuit (ASIC), a field programmable gate array (FPGA), or other programmable logic devices, transistor logic devices, hardware components, or a combination thereof. Various exemplary logic blocks, modules, and circuits disclosed in implementations can be implemented or executed. The processor may also be a combination for implementing computing functions, for example, one or more microprocessors, a combination of DSP and microprocessor, or the like. The communicating unit 503 may be a communication interface, a transceiver, a transceiver circuit, etc. The storage unit 501 may be a memory. When the processing unit 502 is the processor, the communicating unit 503 is the communication interface, and the storage unit 501 is the memory, the terminal of implementations may be the first device illustrated in FIG. 3.

The processing unit 502 is configured to perform any one of the operations performed by the terminal in the foregoing method implementations. In addition, when performing data transmission such as transmitting, the processing unit 502 can invoke the communicating unit 503 to perform such an operation, which will be elaborated below.

The processing unit 502 is configured to obtain, via the communicating unit 503, a mapping between a first QoS parameter and a second QoS parameter. The first QoS parameter is applied to a first QoS flow, and the second QoS parameter is applied to a second QoS flow. The first QoS flow is a QoS flow between a first device and a network device, and the second QoS flow is a QoS flow between the first device and a second device.

In some implementations, the first QoS parameter includes a 5QI, and the second QoS parameter includes a PQI.

In other implementations, the first QoS parameter includes an identifier of the first QoS flow, and the second QoS parameter includes an identifier of the second QoS flow, where the identifier is an ID or an index.

In some implementations, in terms of obtaining, via the communicating unit 503, the mapping between the first QoS parameter and the second QoS parameter, the processing unit 502 is configured to receive, via the communicating unit 503, the mapping between the first QoS parameter and the second QoS parameter from the network device.

In some implementations, the mapping between the first QoS parameter and the second QoS parameter is configured through UE policy signaling.

In some implementations, in terms of receiving, via the communicating unit 503, the mapping between the first QoS parameter and the second QoS parameter from the network device, the processing unit 502 is configured to receive, via the communicating unit 503, the UE policy signaling from the network device, where the UE policy signaling contains the mapping between the first QoS parameter and the second QoS parameter.

In other implementations, the mapping between the first QoS parameter and the second QoS parameter is configured through PDU session signaling.

In some implementations, the processing unit 502 is further configured to transmit, via the communicating unit 503, a PDU session establishment request to the network device when no PDU session for a service of the second device is detected, before receiving, via the communicating unit 503, the mapping between the first QoS parameter and the second QoS parameter from the network device. In terms of receiving, via the communicating unit 503, the mapping between the first QoS parameter and the second QoS parameter from the network device, the processing unit 502 is configured to receive, via the communicating unit 503, a PDU session establishment response transmitted by the network device, where the PDU session establishment response contains the mapping between the first QoS parameter and the second QoS parameter.

In some implementations, the PDU session establishment request contains a relay indication.

In other implementations, the processing unit 502 is further configured to transmit, via the communicating unit 503, a PDU session modification request to the network device when a new QoS flow generated due to a connection between the first device and the second device is detected, before receiving, via the communicating unit 503, the mapping between the first QoS parameter and the second QoS parameter from the network device. In terms of receiving, via the communicating unit 503, the mapping between the first QoS parameter and the second QoS parameter from the network device, the processing unit 502 is configured to receive, via the communicating unit 503, a PDU session modification response transmitted by the network device, where the PDU session modification response contains the mapping between the first QoS parameter and the second QoS parameter.

In some implementations, the PDU session modification request contains a relay indication.

In some implementations, the processing unit 502 is further configured to transmit, via the communicating unit 503, first capability indication information to the network device before obtaining, via the communicating unit 503, the mapping between the first QoS parameter and the second QoS parameter, where the first capability indication information is used for indicating that the first device supports a relay service.

In some implementations, in terms of transmitting, via the communicating unit 503, the first capability indication information to the network device, the processing unit 502 is configured to transmit, via the communicating unit 503, the first capability indication information to the network device during network registration.

In other implementations, in terms of transmitting, via the communicating unit 503, the first capability indication information to the network device, the processing unit 502 is configured to transmit, via the communicating unit 503, the first capability indication information to the network device after network registration.

In other implementations, in terms of transmitting, via the communicating unit 503, the first capability indication information to the network device, the processing unit 502 is configured to transmit, via the communicating unit 503, the first capability indication information to the network device after the first device establishes a first connection with the second device.

In some implementations, the processing unit 502 is further configured to establish an association between the first QoS flow and the second QoS flow according to the mapping between the first QoS parameter and the second QoS parameter.

In some implementations, the processing unit 502 is further configured to obtain, via the communicating unit 503, first data to-be-transmitted, before establishing the association between the first QoS flow and the second QoS flow according to the mapping between the first QoS parameter and the second QoS parameter.

Figure 6:
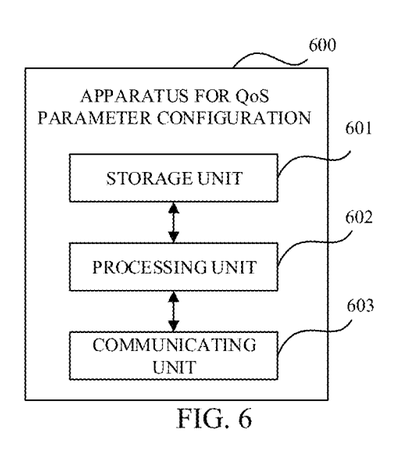
FIG. 6 is a block diagram illustrating functional units of an apparatus for QoS parameter configuration provided in other implementations of the disclosure.

If an integrated unit is adopted, FIG. 6 is a block diagram illustrating functional units of an apparatus for QoS parameter configuration provided in other implementations of the disclosure. The apparatus 600 for QoS parameter configuration is applicable to a network device. The apparatus 600 includes a processing unit 602 and a communicating unit 603. The processing unit 602 is configured to control and manage operations of the network device. For example, the processing unit 602 is configured for the network device to perform operations at step 2a01 illustrated in FIG. 2A and/or other processes described in the technical solutions of implementations. The communicating unit 603 is configured for the network device to communicate with other devices. The network device may further include a storage unit 601. The storage unit 601 is configured to store program codes and data of the network device.

The processing unit 602 may be a processor or a controller and may be, for example, a CPU, a general-purpose processor, a DSP, an ASIC, an FPGA, or other programmable logic devices, transistor logic devices, hardware components, or a combination thereof. Various exemplary logic blocks, modules, and circuits disclosed in implementations can be implemented or executed. The processor may also be a combination for implementing computing functions, for example, one or more microprocessors, a combination of DSP and microprocessor, or the like. The communicating unit 603 may be a communication interface, a transceiver, a transceiver circuit, etc. The storage unit 601 may be a memory. When the processing unit 602 is the processor, the communicating unit 603 is the communication interface, and the storage unit 601 is the memory, the network device of implementations may be the network device illustrated in FIG. 4.

The processing unit 602 configured to transmit, via the communicating unit 603, a mapping between a first QoS parameter and a second QoS parameter. The first QoS parameter is applied to a first QoS flow, and the second QoS parameter is applied to a second QoS flow. The first QoS flow is a QoS flow between a first device and the network device, and the second QoS flow is a QoS flow between the first device and a second device.

In some implementations, the first QoS parameter includes a 5QI, and the second QoS parameter includes a PQI.

In other implementations, the first QoS parameter includes an identifier of the first QoS flow, and the second QoS parameter includes an identifier of the second QoS flow, where the identifier is an ID or an index.

In some implementations, in terms of transmitting, via the communicating unit 603, the mapping between the first QoS parameter and the second QoS parameter, the processing unit 602 is configured to transmit, via the communicating unit 603, the mapping between the first QoS parameter and the second QoS parameter to the first device.

In some implementations, the mapping between the first QoS parameter and the second QoS parameter is configured through UE policy signaling.

In some implementations, in terms of transmitting, via the communicating unit 603, the mapping between the first QoS parameter and the second QoS parameter to the first device, the processing unit 602 is configured to transmit, via the communicating unit 603, the UE policy signaling to the first device, where the UE policy signaling contains the mapping between the first QoS parameter and the second QoS parameter.

In other implementations, the mapping between the first QoS parameter and the second QoS parameter is configured through PDU session signaling.

In some implementations, the processing unit 602 is further configured to receive, via the communicating unit 603, a PDU session establishment request from the first device before transmitting, via the communicating unit 603, the mapping between the first QoS parameter and the second QoS parameter to the first device, where the PDU session establishment request is transmitted by the first device when no PDU session for a service of the second device is detected by the first device. In terms of transmitting, via the communicating unit 603, the mapping between the first QoS parameter and the second QoS parameter to the first device, the processing unit 602 is configured to transmit, via the communicating unit 603, a PDU session establishment response to the first device, where the PDU session establishment response contains the mapping between the first QoS parameter and the second QoS parameter.

In some implementations, the PDU session establishment request contains a relay indication.

In other implementations, the processing unit 602 is further configured to receive, via the communicating unit 603, a PDU session modification request from the first device before transmitting, via the communicating unit 603, the mapping between the first QoS parameter and the second QoS parameter to the first device, where the PDU session modification request is transmitted by the first device when the first device detects that a new QoS flow is generated due to a connection between the first device and the second device. In terms of transmitting, via the communicating unit 603, the mapping between the first QoS parameter and the second QoS parameter to the first device, the processing unit 602 is configured to transmit, via the communicating unit 603, a PDU session modification response to the first device, where the PDU session modification response contains the mapping between the first QoS parameter and the second QoS parameter.

In some implementations, the PDU session modification request contains a relay indication.

In some implementations, the processing unit 602 is further configured to receive, via the communicating unit 603, first capability indication information from the first device before transmitting, via the communicating unit 603, the mapping between the first QoS parameter and the second QoS parameter, where the first capability indication information is used for indicating that the first device supports a relay service.

In some implementations, the first capability indication information is transmitted by the first device during network registration.

In other implementations, the first capability indication information is transmitted by the first device after network registration.

In other implementations, the first capability indication information is transmitted by the first device after the first device establishes a first connection with the second device.

It can be understood that, since method implementations and apparatus implementations are different presentation forms of the same technical concept, the content of the method implementations of the disclosure should be synchronized to the apparatus implementations, which will not be repeated herein.

Implementations further provide a chip. The chip includes a processor. The processor is configured to invoke and execute computer programs stored in a memory, to cause a device equipped with the chip to perform some or all operations performed by a terminal in the foregoing method implementations.

Implementations further provide a computer readable storage medium. The computer readable storage medium is configured to store computer programs used for electronic data interchange (EDI). The computer programs are operable with a computer to perform some or all operations performed by a terminal in the foregoing method implementations.

Implementations further provide a computer readable storage medium. The computer readable storage medium is configured to store computer programs used for EDI. The computer programs are operable with a computer to perform some or all operations performed by a network-side device in the foregoing method implementations.

Implementations further provide a computer program product. The computer program product includes computer programs. The computer programs are operable with a computer to perform some or all operations performed by a terminal in the foregoing method implementations. The computer program product may be a software installation package.

The steps of the method or algorithm described in implementations of the disclosure may be implemented by means of hardware, or may be implemented by executing software instructions by a processor. The software instructions can be implemented by corresponding software modules, which can be stored in a random access memory (RAM), a flash memory, a read only memory (ROM), an erasable programmable ROM (EPROM), an electrically EPROM, EEPROM), registers, hard disk, mobile hard disk, compact disc (CD)-ROM, or any other form of storage medium known in the art. An exemplary storage medium is coupled to the processor, such that the processor can read information from the storage medium and write information to the storage medium. The storage medium can also be a component of the processor. The processor and the storage medium may be located in an ASIC. In addition, the ASIC can be located in an access network device, a target network device, or a core network device. The processor and the storage medium may also be present as discrete components in the access network device, the target network device, or the core network device.

Those skilled in the art will appreciate that, all or part of functions described in one or more of the foregoing implementations can be implemented through software, hardware, firmware, or any other combination thereof. When implemented by software, all or part of the functions can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for quality of service (QoS) parameter configuration, comprising:
    obtaining, by a first device, a mapping between a first QoS parameter and a second QoS parameter, wherein the first QoS parameter is applied to a first QoS flow, and the second QoS parameter is applied to a second QoS flow, wherein the first QoS flow is a QoS flow between the first device and a network device, and the second QoS flow is a QoS flow between the first device and a second device;
    wherein the method further comprises:
        before obtaining, by the first device, the mapping between the first QoS parameter and the second QoS parameter,
            transmitting, by the first device, first capability indication information to the network device, wherein the first capability indication information is used for indicating that the first device supports a relay service;
    wherein transmitting, by the first device, the first capability indication information to the network device comprises:
        transmitting, by the first device, the first capability indication information to the network device during network registration;
    wherein obtaining, by the first device, the mapping between the first QoS parameter and the second QoS parameter comprises:
        receiving, by the first device, the mapping between the first QoS parameter and the second QoS parameter from the network device;
    wherein the mapping between the first QoS parameter and the second QoS parameter is configured through PDU (packet data unit) session signaling, wherein receiving, by the first device, the mapping between the first QoS parameter and the second QoS parameter from the network device comprises:
        receiving, by the first device, a PDU session establishment response from the network device after transmitting a PDU session establishment request to the network device, wherein the PDU session establishment response contains the mapping between the first QoS parameter and the second QoS parameter.

2. The method of claim 1, wherein the first QoS parameter comprises a $5^{th}$ generation (5G) QoS index (5QI), and the second QoS parameter comprises a PC5 QoS index (PQI).

3. A method for quality of service (QoS) parameter configuration, comprising:
    transmitting, by a network device, a mapping between a first QoS parameter and a second QoS parameter, wherein the first QoS parameter is applied to a first QoS flow, and the second QoS parameter is applied to a second QoS flow, wherein the first QoS flow is a QoS flow between a first device and the network device, and the second QoS flow is a QoS flow between the first device and a second device;
    wherein before transmitting, by the network device, the mapping between the first QoS parameter and the second QoS parameter,
        receiving, by the network device, first capability indication information from the first device, wherein the first capability indication information is used for indicating that the first device supports a relay service;
    wherein the first capability indication information is transmitted by the first device during network registration;
    wherein transmitting, by the network device, the mapping between the first QoS parameter and the second QoS parameter comprises:
        transmitting, by the network device, the mapping between the first QoS parameter and the second QoS parameter to the first device;
    wherein the mapping between the first QoS parameter and the second QoS parameter is configured through PDU (packet data unit) session signaling, wherein transmitting, by the network device, the mapping between the first QoS parameter and the second QoS parameter to the first device comprises:

transmitting, by the network device, a PDU session establishment response to the first device after receiving a PDU session establishment request from the first device, wherein the PDU session establishment response contains the mapping between the first QoS parameter and the second QoS parameter.

4. The method of claim 3, wherein the first QoS parameter comprises a 5th generation (5G) QoS index (5QI), and the second QoS parameter comprises a PC5 QoS index (PQI).

5. A first device, comprising:
a transceiver;
a memory storing one or more programs; and
a processor configured to execute the one or more programs to cause the transceiver: obtain a mapping between a first quality of service (QoS) parameter and a second QoS parameter, wherein the first QoS parameter is applied to a first QoS flow, and the second QoS parameter is applied to a second QoS flow, wherein the first QoS flow is a QoS flow between the first device and a network device, and the second QoS flow is a QoS flow between the first device and a second device;
wherein the transceiver is further configured to:
transmit first capability indication information to the network device before obtaining the mapping between the first QoS parameter and the second QoS parameter, wherein the first capability indication information is used for indicating that the first device supports a relay service;
wherein the transceiver configured to transmit first capability indication information to the network device is configured to:
transmit the first capability indication information to the network device during network registration;
wherein the transceiver configured to obtain the mapping between the first QoS parameter and the second QoS parameter is configured to:
receive the mapping between the first QoS parameter and the second QoS parameter from the network device;
wherein the mapping between the first QoS parameter and the second QoS parameter is configured through PDU (packet data unit) session signaling, wherein the transceiver configured to receive the mapping between the first QoS parameter and the second QoS parameter from the network device is configured to:
receive a PDU session establishment response from the network device after transmitting a PDU session establishment request to the network device, wherein the PDU session establishment response contains the mapping between the first QoS parameter and the second QoS parameter.

6. The first device of claim 5, wherein the first QoS parameter comprises a $5^{th}$ generation (5G) QoS index (5QI), and the second QoS parameter comprises a PC5 QoS index (PQI).

7. An network device, comprising:
a transceiver;
a memory storing one or more programs; and
a processor configured to execute the one or more programs to cause the transceiver: transmit a mapping between a first QoS parameter and a second QoS parameter, wherein the first QoS parameter is applied to a first QoS flow, and the second QoS parameter is applied to a second QoS flow, wherein the first QoS flow is a QoS flow between a first device and the network device, and the second QoS flow is a QoS flow between the first device and a second device;
wherein the transceiver is further configured to:
before transmitting the mapping between the first QoS parameter and the second QoS parameter,
receive first capability indication information from the first device,
wherein the first capability indication information is used for indicating that the first device supports a relay service;
wherein the first capability indication information is transmitted by the first device during network registration;
wherein the transceiver configured to transmit a mapping between a first QoS parameter and a second QoS parameter is configured to:
transmit the mapping between the first QoS parameter and the second QoS parameter to the first device;
wherein the mapping between the first QoS parameter and the second QoS parameter is configured through PDU (packet data unit) session signaling, wherein the transceiver configured to transmit the mapping between the first QoS parameter and the second QoS parameter to the first device is configured to:
transmit a PDU session establishment response to the first device after receiving a PDU session establishment request from the first device, wherein the PDU session establishment response contains the mapping between the first QoS parameter and the second QoS parameter.

8. The network device of claim 7, wherein the first QoS parameter comprises a $5^{th}$ generation (5G) QoS index (5QI), and the second QoS parameter comprises a PC5 QoS index (PQI).

* * * * *